(12) United States Patent
Rodriguez, Jr.

(10) Patent No.: US 6,394,610 B2
(45) Date of Patent: May 28, 2002

(54) INTEGARATED FRONT PROJECTION DIGITAL WHITEBOARD SYSTEM

(75) Inventor: Ernesto M. Rodriguez, Jr., Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/877,271

(22) Filed: Jun. 8, 2001

Related U.S. Application Data

(63) Continuation of application No. 09/616,563, filed on Jul. 14, 2000, which is a continuation of application No. 09/261,715, filed on Mar. 3, 1999, now Pat. No. 6,179,426.

(51) Int. Cl.⁷ .............................................. G03B 21/14
(52) U.S. Cl. .......................... 353/79; 353/119; 353/70
(58) Field of Search ............................. 353/39, 69, 70, 353/79, 119, 122; 248/917, 918, 919, 920

(56) References Cited

U.S. PATENT DOCUMENTS

| | | | |
|---|---|---|---|
| 1,979,921 A | 11/1934 | Wier | 353/79 |
| 3,940,209 A | 2/1976 | Portner et al. | 353/79 |
| 3,951,534 A | 4/1976 | Altman | 353/70 |
| 4,012,115 A | 3/1977 | Brown | 350/128 |
| 4,092,064 A | 5/1978 | Puel | 353/79 |
| 4,130,352 A | 12/1978 | Overman et al. | 353/79 |
| 4,156,561 A | 5/1979 | Lucas | 353/38 |
| 4,298,246 A | 11/1981 | Iwamura | 350/122 |
| 4,565,430 A | 1/1986 | Grunwald | 353/61 |
| 4,571,631 A | 2/1986 | Breglia et al. | |

(List continued on next page.)

FOREIGN PATENT DOCUMENTS

| | | | |
|---|---|---|---|
| CN | 1226687 A | 8/1999 | G03B/21/56 |
| DE | 197 12 244 A1 | 10/1998 | G03B/21/10 |
| EP | 0 837 351 A2 | 4/1998 | G02B/27/28 |
| EP | 0 837 351 A3 | 12/1998 | G02B/27/28 |
| EP | 1 018 842 A2 | 7/2000 | H04N/9/31 |
| JP | 05297465 | 11/1993 | G03B/21/60 |
| JP | 11331737 | 11/1999 | |
| JP | 2000206452 | 7/2000 | |

OTHER PUBLICATIONS

International Search Report, PCT/US99/14803 mailed Jun. 3, 2000.

Primary Examiner—William Dowling
(74) Attorney, Agent, or Firm—Yen Tong Florczak

(57) ABSTRACT

An integrated front projection display system having a planar projection screen formed on a front surface of a rigid frame, the screen including means for reflecting light from the screen in a preselected spatial distribution. A movable arm is hingedly connected at a first end to the rigid frame, the arm being movable between a storage position and a projection position, the arm further comprising means for moving the arm between said storage and projection positions and for retaining the arm at each of said positions. A projection head is mounted on a second end of the movable arm such that it does not substantially obstruct the view of the projection screen when the arm is in the projection position. The projection head including means for providing an image to be displayed, means for focusing the image onto the projection screen, and means for correcting the keystone effect in the projected image when the arm is in the projection position; and a digital whiteboard system comprising at least one sensor to track the movement of a stylus on the projection screen. The frame has at least one side member and the digital whiteboard system is mounted on one of said side member. The digital whiteboard system may be modular and removable. The screen includes an erasable whiteboard. The at least one sensor may be UV sensor, an IR sensor, laser or other types of receptors. The at least one sensor is attached to the frame. The system may further include a stylus, where the stylus includes transmitters that provide signals to the at least one sensor.

30 Claims, 18 Drawing Sheets

U.S. PATENT DOCUMENTS

| | | | |
|---|---|---|---|
| 4,756,615 A | 7/1988 | Hildebrand | 353/74 |
| 4,787,737 A | 11/1988 | Ogawa et al. | 353/57 |
| 4,911,529 A | 3/1990 | Van DeVen | 350/127 |
| 5,096,278 A | 3/1992 | Yoshioka et al. | 359/459 |
| 5,210,641 A | 5/1993 | Lewis | 359/448 |
| 5,278,596 A | 1/1994 | Machtig | 353/122 |
| 5,349,400 A | 9/1994 | Kaplan et al. | 353/119 |
| 5,355,188 A | 10/1994 | Biles et al. | |
| 5,379,080 A | 1/1995 | Onozuka | |
| 5,414,521 A | 5/1995 | Ansley | |
| 5,624,173 A | 4/1997 | Davidson | 353/119 |
| 5,663,817 A | 9/1997 | Frapin et al. | 349/5 |
| 5,694,245 A | 12/1997 | Goto et al. | 359/460 |
| 6,023,369 A | 2/2000 | Goto | 359/443 |

INTEGARATED FRONT PROJECTION DIGITAL WHITEBOARD SYSTEM

This patent application is a continuation of U.S. patent application Ser. No. 09/616,563, entitled "Integrated Front Projection System", filed Jul. 14, 2000, which is a continuation of U.S. patent application Ser. No. 09/261,715 filed Mar. 9, 1999 now issued as U.S. Pat. No. 6,179,426.

BACKGROUND OF THE INVENTION

The present invention relates to an integrated front projection display system. In particular, the present invention relates to a low-profile integrated front projection system that coordinates specialized projection optics and an integral screen optimized to work in conjunction with the optics to create the best viewing performance and produce the necessary keystone correction.

Electronic or video display systems are devices capable of presenting video or electronically generated images. Whether for use in home-entertainment, advertising, videoconferencing, computing, data-conferencing or group presentations, the demand exists for an appropriate video display device.

Image quality remains a very important factor in choosing a video display device. However, as the need increases for display devices offering a larger picture, factors such as cost and device size and weight are becoming vital considerations. Larger display systems are preferable for group or interactive presentations. The size of the display system cabinet has proven an important factor, particularly for home or office use, where space to place a large housing or cabinet may not be available. Weight of the display system also is an important consideration, especially for portable or wall-mounted presentations.

Currently, the most common video display device is the typical CRT monitor, usually recognized as a television set. CRT devices are relatively inexpensive for applications requiring small to medium size images (image size traditionally is measured along the diagonal dimension of a rectangular screen). However, as image size increases, the massive proportions and weight of large CRT monitors become cumbersome and severely restrict the use and placement of the monitors. Also, screen curvature issues appear as the screen size increases. Finally, large CRT monitors consume a substantial amount of electrical power and produce electromagnetic radiation.

One alternative to conventional CRT monitors is rear projection television. Rear projection television generally comprises a projection mechanism or engine contained within a large housing for projection up on the rear of a screen. Back-projection screens are designed so that the projection mechanism and the viewer are on opposite sides of the screen. The screen has light transmitting properties to direct the transmitted image to the, viewer.

By their very nature, rear projection systems require space behind the screen to accommodate the projection volume needed for expansion of the image beam. As background and ambient reflected light may seriously degrade a rear projected image, a housing or cabinet generally encloses the projection volume. The housing may contain a mirror or mirrors so as to fold the optical path and reduce the depth of the housing. The need for "behind-the-screen" space precludes the placing of a rear projection display on a wall.

A new category of video presentation systems includes so-called thin Plasma displays. Much attention has been given to the ability of plasma displays to provide a relatively thin (about 75–100 nun) cabinet, which may be placed on a wall as a picture display in an integrated compact package. However, at the present time, plasma displays 3 are costly and suffer from the disadvantages of low intensity (approx. 200–400 $cd/m^2$ range) and difficulty in making repairs. Plasma display panels are heavy (~80–100 lbs., ~36–45 kg.), and walls on which they are placed may require structural strengthening.

A traditional type of video presentation device that has not received the same degree of attention for newer applications is front-projection systems. A front-projection system is one that has the projection mechanism and the viewer are on the same side of the screen. Front projection systems present many different optical and arrangement challenges not present in rear projection systems, as the image is reflected back to the audience, rather than transmitted. An example of front projection systems is the use of portable front projectors and a front projection screen, for use in meeting room settings or in locations such as an airplane cabin.

One of the advantages of front projectors is the size of the projection engine. Electronic front projectors traditionally have been designed for the smallest possible "footprint", a term used to describe the area occupied on a table or bench, by the projector. Portable front projectors have been devised having a weight of about 10–20 lbs. (~4.5–9 kg.).

Nevertheless, front projection systems have traditionally not been considered attractive for newer interactive applications because of factors such as blocking of the image by the projector or the presenter, poor image brightness, image distortion and setup 2o difficulties.

Traditional electronic front projectors typically require a room that may afford the projection volume necessary for image expansion without any physical obstructions. Although images may be projected upon a large clear flat surface, such as a wall, better image quality is achieved by the use of a separate screen. FIGS. 1 and 2 illustrate a traditional front projection system. A projector 10 is placed on a table or other elevated surface to project an image upon a screen or projection surface 20. Those familiar with the use of electronic projectors will appreciate that tilting the projector below the normal axis of the screen produces a shape distortion of the image, known as a keystone effect. Most new electronic projectors offer a limited degree of keystone correction. However, as may be appreciated in FIG. 2, the placement of the projector may still interfere with the line of sight of the audience.

Of greater significance is the fact that to achieve a suitable image size, and also due 10 to focus limitations, the projector 10 requires a certain "projection zone" in front of the screen 20. Table A lists the published specifications for some common electronic projectors currently in the market.

TABLE A

| Projector Type | Lens Focal Length | Imager Diagonal | Smallest Screen Diagonal | Shortest Throw Distance | Throw Ratio | Maximum Keystone Correction |
|---|---|---|---|---|---|---|
| CTX Opto ExPro 580 | * | 163 MM Transmissive LCD | 1.0 m | 1.1 m | 1.1 | 20° offset/ optical |
| InFocus LP425 | * | 18 mm Reflective DMD | 1.3 m | 1.5 m | 1.2 | 18° offset |

TABLE A-continued

| Projector Type | Lens Focal Length | Imager | Smallest Screen Diagonal | Shortest Throw Distance | Throw Ratio | Maximum Keystone Correction |
|---|---|---|---|---|---|---|
| Chisholm Dakota X800 | 43–58.5 mm | 23 mm Reflective LCD | 0.55 m | 1.2 m | 2.2 | 15° electronic |
| Epson Powerlite 7300 | 55–72 mm | 33.5 Transmissive LCD | 0.58 m | 1.1 m | 1.9 | * |
| Proxima Impression A2 | 45–59 mm | 23 mm Transmissive LCD | 0.5 m | 1.0 m | 2.0 | 12° offset |
| 3M MP8620 | 167 mm | 163 mm Transmissive LCD | 1.0 m | 1.2 m | 1.2 | 16° offset/optical |

*Not given in published specifications

Throw distance is defined as the distance from the projection lens to the projection screen. Throw ratio usually is defined as the ratio of throw distance to screen diagonal. The shortest throw distance available for the listed projectors is one meter. To achieve a larger image, between 40 to 60 inches (~1 to 1.5 meters), most projectors must be positioned even farther away, at least 8 to 12 feet (approximately 2.5 to 3.7 meters) away from the wall or screen.

The existence of this "projection zone" in front of the screen prevents the viewer from interacting closely with the projected image. If the presenter, for example, wishes to approach the image, the presenter will block the projection and cast a shadow on the screen.

Traditional integrated projectors require optical adjustment, such as focusing every time the projector is repositioned, as well as mechanical adjustment, such as raising of front support feet. Electronic connections, such as those to a laptop computer, generally are made directly to the projector, thus necessitating that the projector be readily accessible to the presenter or that the presenter runs the necessary wiring in advance.

Another problem with front projectors is the interference by ambient light. In a traditional front projector a significant portion of the projected light is scattered and is not reflected back to the audience. The loss of the light results in diminished image brightness. Accordingly, a highly reflective screen is desirable. However, the more reflective the screen, the larger the possible degradation of the projected image by ambient light sources. The present solution, when viewing high quality projection systems such as 35 mm photographic color slide presentation systems, is to attempt to extinguish an ambient lights. In some very critical viewing situations, an attempt has been made even to control the re-reflection of light originating from the projector itself Some screen designers have attempted to address the ambient light problem with "mono-directional reflection" screens, that is, a projection screen attempts to absorb light not originating from the projector, while maximizing the reflection of incident light originating from the direction of the projector. Nevertheless, since portable projectors are, in fact, portable and are used at various throw distances and projection angles, it has proven very difficult to optimize a screen for all possible projector positions and optical characteristics.

An alternative is to design a dedicated projection facility. Such a design necessitates a dedicated conference room, in which the projector and screen position, as well as the projector's optical characteristics, are rigorously controlled and calibrated. Structural elements may be used to suspend the selected projector from the ceiling. Once calibrated, such system would be permanently stationed. Such a facility may suffer from high costs and lack of portability.

Another issue that prevents optimal performance by front projectors is the keystone effect. If projectors are placed off-center from the screen, keystoning will occur. Keystoning is a particular image distortion where the projection of a rectangular or square image results in a screen image that resembles a keystone, that is a quadrilateral having parallel upper and lower sides, but said sides being of different lengths.

Methods for the reduction of keystoning again are dependent upon the position of the projector with respect to the screen. Keystone correction may be achieved by optical and by electronic methods. For large keystone correction in LCD imagers, optical methods are presently preferable, as electronic methods may suffer from pixelation distortion, as pixels become misaligned. Presently, to the applicants' knowledge, the available optical keystone correction in commercially available portable electronic front projectors is between 10° to 20°.

The need remains for a large screen video presentation system that offers efficient space utilization, lower weight and attractive pricing. Such a system should preferably yield bright, high-quality images in room light conditions.

SUMMARY OF THE INVENTION

An embodiment of the present invention comprises a front projection display system that integrates an optical engine, having control and power supply electronics, and a dedicated projection screen to provide a compact video display device. The projection engine is coupled to a high gain projection screen, having an optimized reflection pattern to give optimum optical performance in ambient light and viewing angle sensitive environments. Components of the projection engine are modularly placed in a retractable arm, pivotally connected to the screen. The arm offers precise registration to the screen apparatus and thus repeatably precisely aligns optically and mechanically to the screen. The projection wall system has an open projection position and a closed storage position. The architecture is very flat and light, having depth of less than three inches (~7.5 cm.) and a weight of less than 25 pounds (11 kilograms). Use of a radically offset projection head having matching keystone correction features allows the arm to protrude above the head of the presenter and offer a sharp and unobtrusive projection zone.

An exemplary integrated front projection display in accordance with the present invention includes a front projection screen, a pivoting arm coupled to the flat projection screen, the arm having a storage position and a projection position- and a front projection head coupled to the arm. When the arm is in the projection position, the front projection head is at a predetermined position with respect to the front projection screen.

The projection head includes projection optics having mechanical off-axis keystone correction compensation greater than or approximately equal to 22°, a throw distance of at most 800 mm, a throw-to-screen diagonal ratio of at most 1.

The front projection screen may have a vertically graduated reflection distribution, wherein light rays emanating from the projection position generally are reflected by the projection screen in a preselected direction, normal to the vertical axis of the screen. In the horizontal direction, the screen has a horizontal distribution, wherein the light rays generally are reflected along a predetermined illumination spread with respect to the horizontal axis.

The front projection display further may include modular and separate electronic and imaging modules. The imaging module may be placed inside the projection head and the electronic module is placed in the swiveling arm.

The electronic module may be enclosed by a honeycomb structure. A cooling fan produces a cooling air current and the honeycomb structure directs the cooling current to flow through the length of the hollow structure. The honeycomb acts as a heat exchanger and the heat generated by the projector is dissipated by convection by the cooling current. The honeycomb structure also acts as an EMI/RFI shield. The cell size, material thickness and orientation of the honeycomb structure are tuned to attenuate undesirable high electromagnetic frequencies.

In an alternative embodiment, the front projection display may include a light source remotely placed from the imaging components and a flexible illumination waveguide. The illumination waveguide then optically couples the light source to the imaging components in the projection head. Also in alternative embodiments, the front projection display system may include a CPU placed within the frame and digital annotation components.

DETAILED DESCRIPTION OF THE INVENTION

Figure 1:
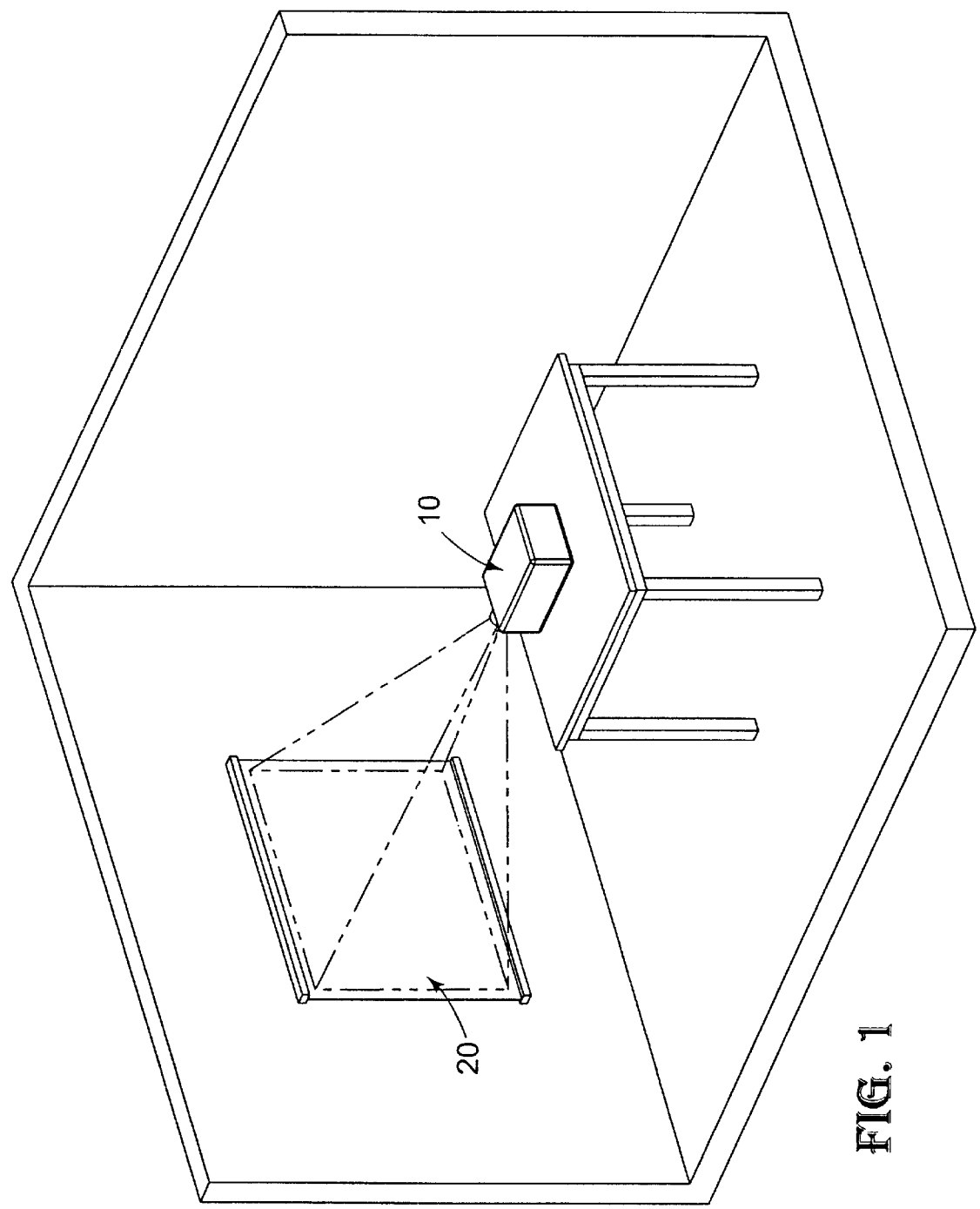
FIG. 1 is a perspective view of a traditional projection device and screen arrangement.
Figure 2:
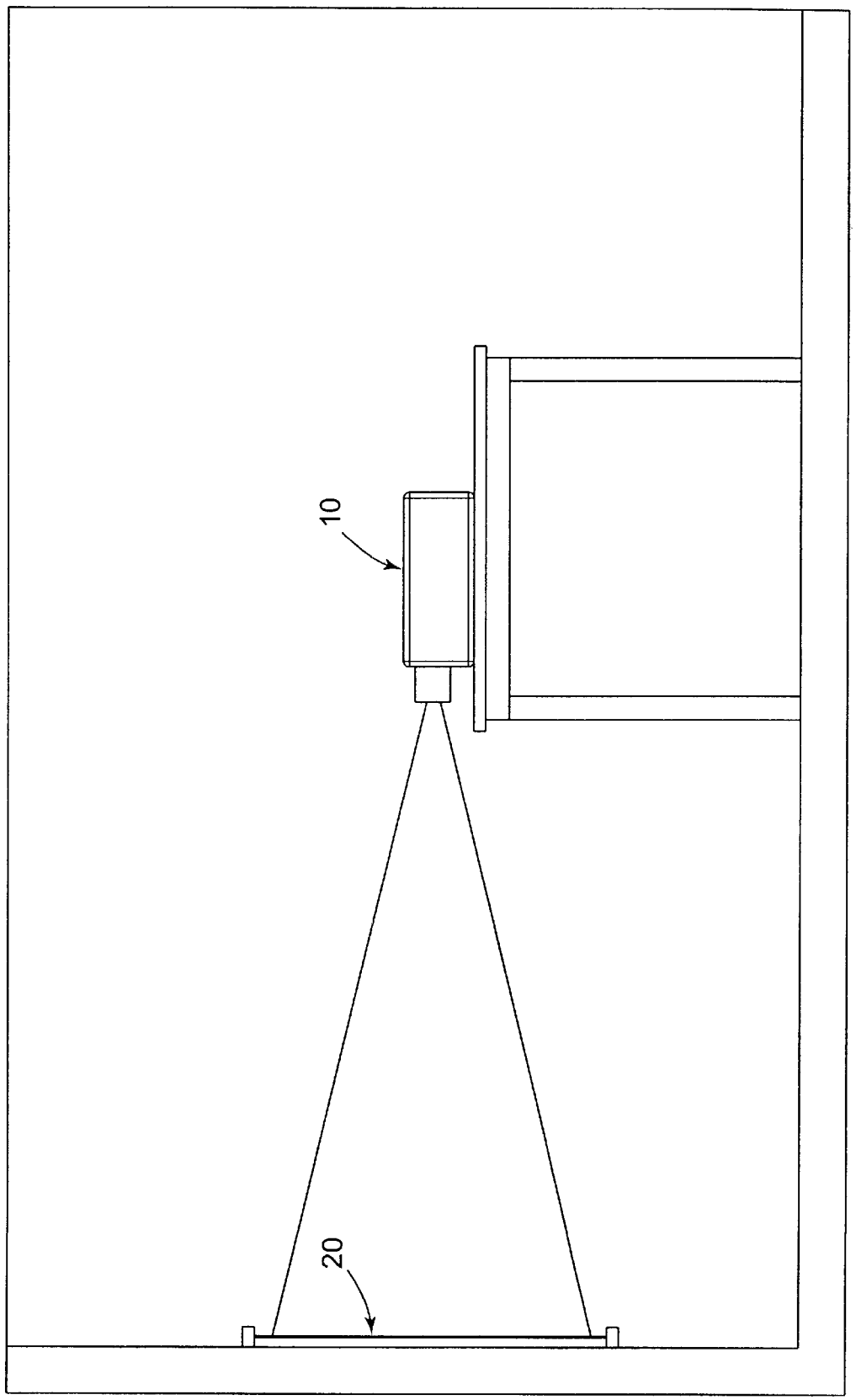
FIG. 2 is an elevation side view of the arrangement illustrated in FIG. 1.
Figure 3:
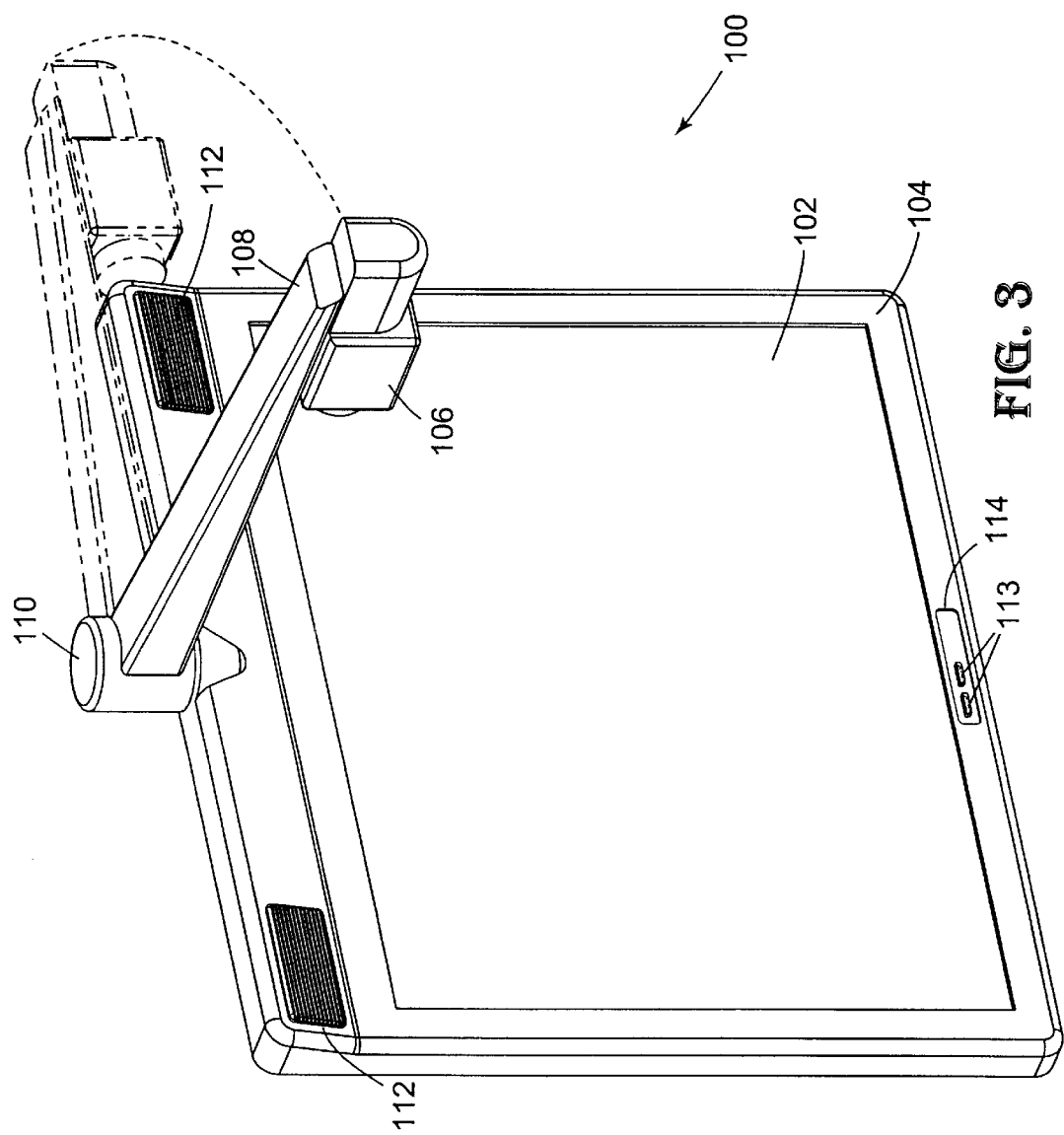
FIG. 3 is a perspective view of an integrated front projection system in accordance with the present invention in the use or projection position.

A preferred embodiment of the present invention comprises a front projection system that integrates an optical engine, having modular control and power supply electronics, and a dedicated projection screen to provide a compact and light video display device. FIGS. 3–6 illustrate a first exemplary embodiment of an integrated front projection system 100 in accordance with the present invention.

The front projection system 100 includes a dedicated high gain projection screen 102 mounted on a frame 104. A projection head 106 is pivotally mounted by an arm 108 to a center top portion of the frame 104 at a hinge unit I 10. The arm 108 may be rotated out 90' allowing the projection head 106 to pivot from a closed or storage position to an opened or projection position.

The screen 102 is optically coupled to the projection head. The screen 102 may be a flexible material extended over frame 104 or may be a rigid component. In an alternative embodiment, both the screen and the frame are made of an integral sheet of material. The screen 102 may include multiple-layers or special coatings, such as to allow its use as an erasable whiteboard.

The frame 104 contains and supports other components of the system. The frame 104 may house additional components such, as integrated speakers 112, input and output jacks 113, and a control panel 114. In the present exemplary embodiment, the mechanical infrastructure of the projection system 100, the arm 108 and the frame 104, include lightweight materials such as aluminum magnesium or plastic composites. The entire projection system, accordingly, is relatively light (20–25 pounds, 9–11 kilograms).

Figure 4:
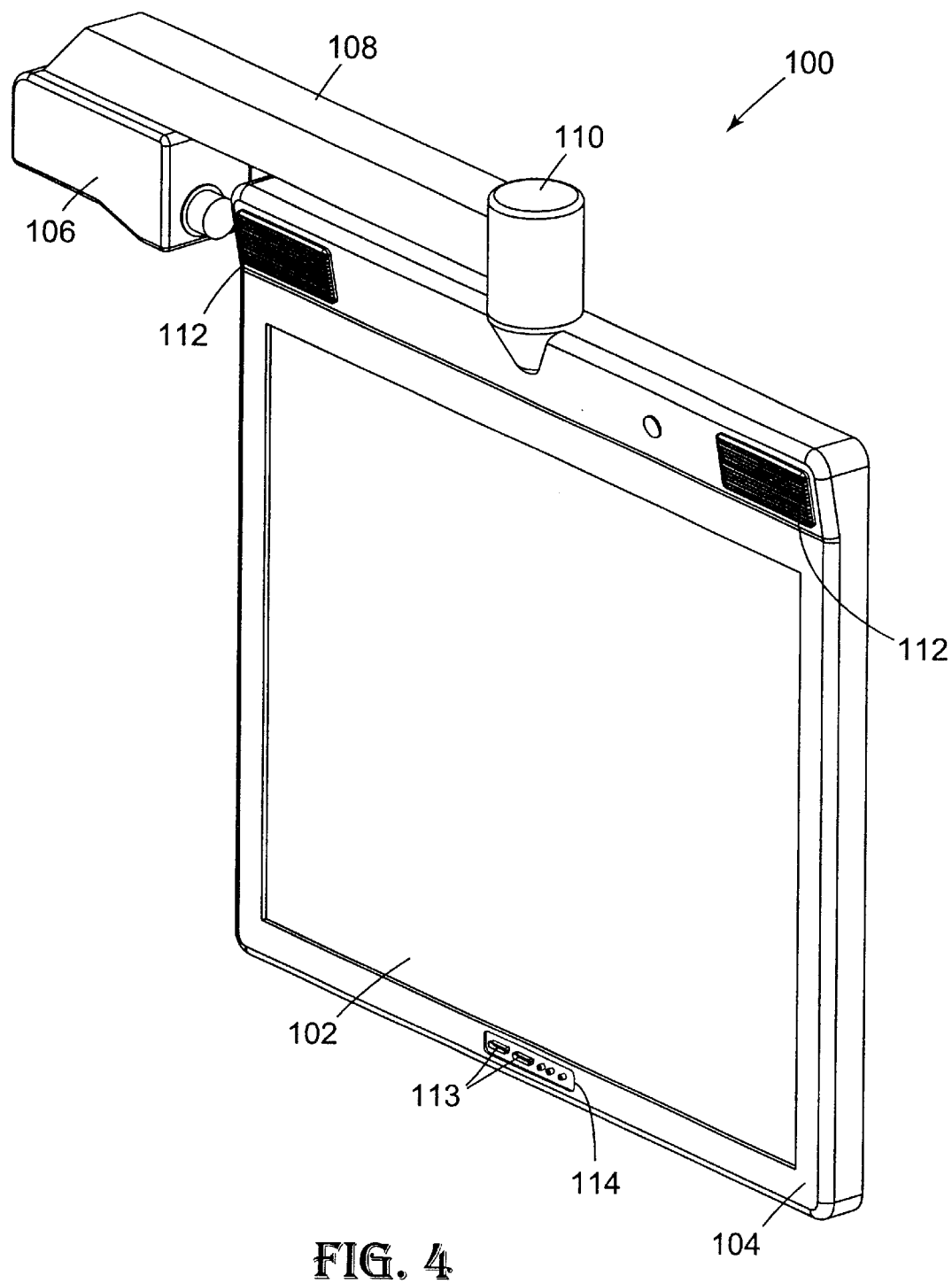
FIG. 4 is a perspective view of the integrated front projection system illustrated in FIG. 3 in the closed or storage position.

In the present exemplary embodiment, the arm 108 is rigid and hollow. The arm 108 comprises die cast aluminum or magnesium, or other suitable materials, surrounded by a hard plastic shell. At the top and center of the frame 104, the hinge unit 10 allows the projection arm 108 and head 106 to pivot between a closed (storage) position and an open (use) position. FIG. 4 illustrates the projection system 100 in a closed or storage position. When not in use, the arm 108 may be kept in the closed position as to be substantially parallel with the frame 104, and thus present no obstruction to objects that may be moving in the space in front of the frame 104. Although the arm is shown folded back to an audience left position, the system may be adaptable to allow storage of the arm and projection head to an audience fight position. An ability to select storage position may be valuable in avoiding obstacles present in the projection area prior to the installation of the system. The ability of the arm 108 to rotate contributes to the projection system's minimal thickness, approximately 2–3 inches (5–7.5 cm.), in the storage position.

The system 100 allows for the projection head 106 to be placed in an exact pivotal registration in the operating or projection mode in relation to the optical screen 102. In system 100, use position is at a normal arm angle with respect to the screen and generally above the screen. However, other embodiments may be designed around other predetermined positions. Movement between the two positions may be assisted manually or may be motor-driven.

In the present embodiment, an electrical motor 116 residing within the hinge unit 110 controls the movement of the arm 108. The motor 116 may be AC, DC, manually driven by détentes, over-center-cam (spring loaded) or any other suitable type that provides reliable repeatable positioning. The motor 116 is a precision guided gear drive motor having two limit sensor switches to accurately position the arm 108, and accordingly, the projection head 106, in precise and repeatable closed and open positions.

The movement of the arm 108 and the functions of the projector system 100 may be controlled through the control panel 114, a remote control (not shown), or other control mechanism. While the arm 108 of the projection system 100 is pivotally fixed at a single point, those skilled in the art will readily appreciate that a variety of different linkage and/or pivoting mechanisms may be implemented within the spirit of the present invention. In alternative embodiments, the head and arm may include additional hinge or telescopic movement and the arm may be coupled to other portions of the frame or to a wall or post.

As explained in more detail in relation to FIGS. 14–17, the system 100 optimizes the coupling of the projection engine with the exact positioning of the head 106 in relation to the screen 102 to yield high contrast, brightest enhancement, image uniformity, optimal image position, and sharp focus. Since the optical parameters of the projection engine are known and selected for compatibility and the exact position of the projector head 106 in the use position is known and predetermined, the exemplary screen 102 may be designed and optimized to provide maximum illumination for the audience while reducing interference by ambient light.

When active, the projection system I 00 generates a beam of light having a plurality of light rays 162. In relation to a coordinate system wherein the screen defines a z-plane, each fight ray 162 includes components along both the horizontal x-plane and the vertical y-plane. The angle of incidence of each light beam 162 upon the screen 102 depends on the optical characteristics of the projector, such as F/#, and the position of the projection head 106 in relation to the screen 102.

Figure 14:
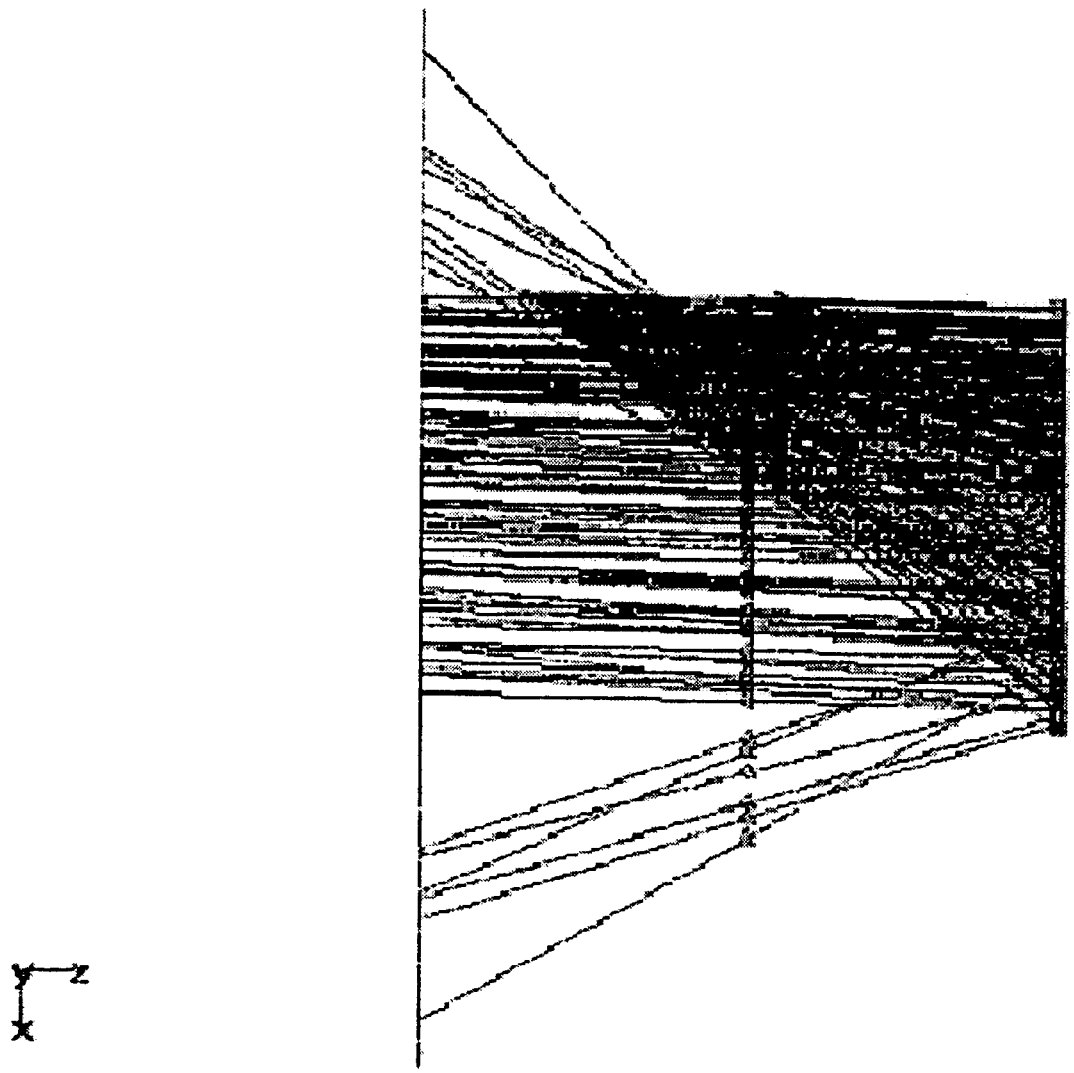
FIG. 14 is a side elevation view of the vertical reflection pattern of a controlled light distribution front projection screen in accordance with the present invention.

FIG. 14 is a side elevation of a vertical axis ray diagram, illustrating the reflection of tight beams 162 emitted by projection system 100. Point 60 is the known precise location of the ideal point source for projection lens 140 (illustrated in FIG. 6) when the projection head 106 is in the "USE" position. The angles of incidence of the light beams 162 on the screen increase along the positive x-direction (see directional axis in FIG. 14).

In a traditional screen, the light rays 162 would each be reflected in accordance with their angle of incidence. Especially at the sharp projection angle of system 100, the resulting light pattern would be scattered, with only a portion of the light rays reaching the audience. To compensate for the graduated increase in incidence angles, the screen 102 20 includes a vertically graduated reflection pattern oriented to receive the projected light rays 162 at the expected incidence angle for each point on the screen 102 and to reflect the rays approximately at normal angle along the vertical plane. The light beams 162 are reflected in a direction vertically close to normal because that corresponds to the expected location of the audience. In alternative embodiments where the audience is expected to be in a different position, a different reflection pattern may be implemented.

Figure 15:
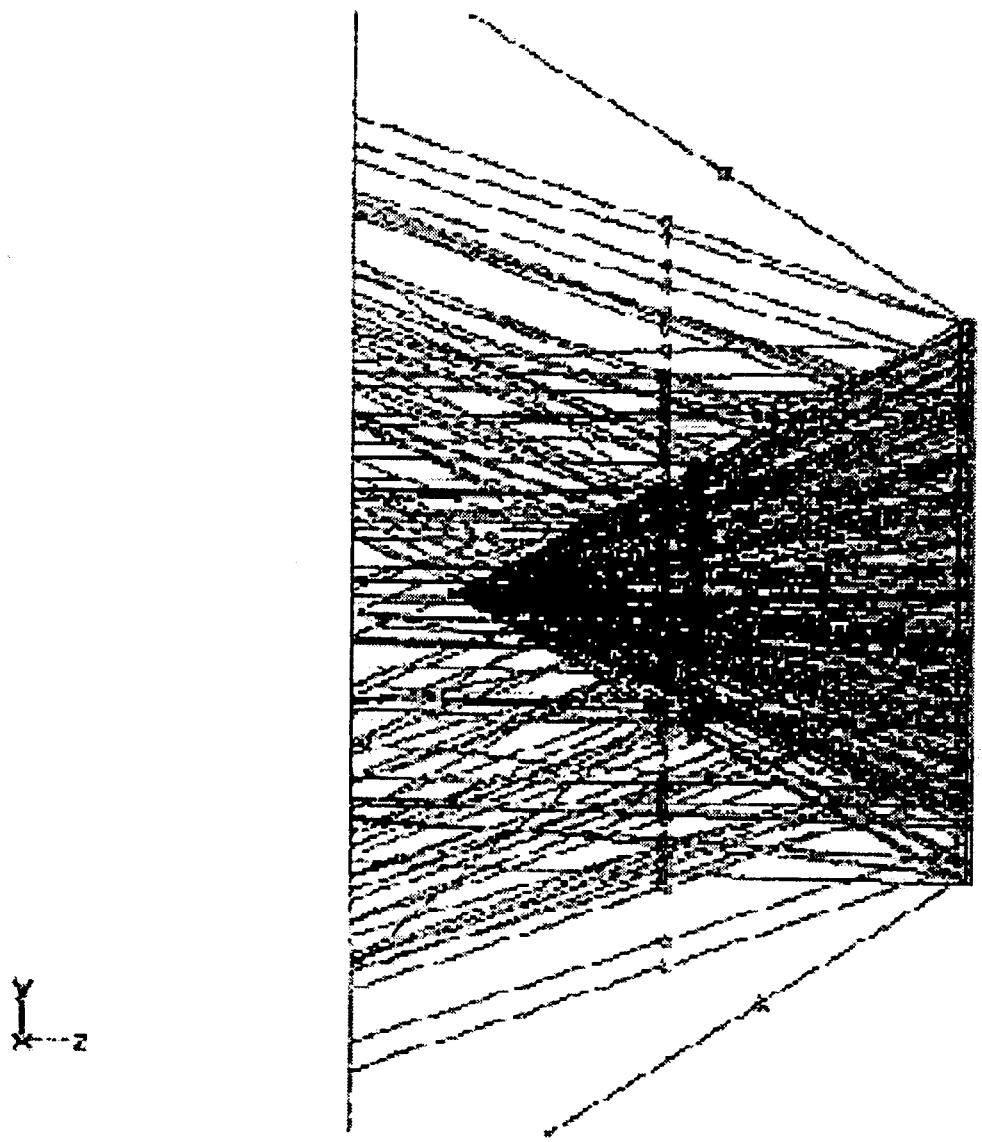
FIG. 15 is a plan view of the horizontal reflection pattern of the front projection system illustrated in FIG. 14.

FIG. 15 illustrates a top plan view of the horizontal distribution of the light emanating from point 60. As the audience is expected to be horizontally distributed, the horizontal reflection pattern of the screen is arranged to provide a wider illumination spread in the horizontal direction.

Figure 16:
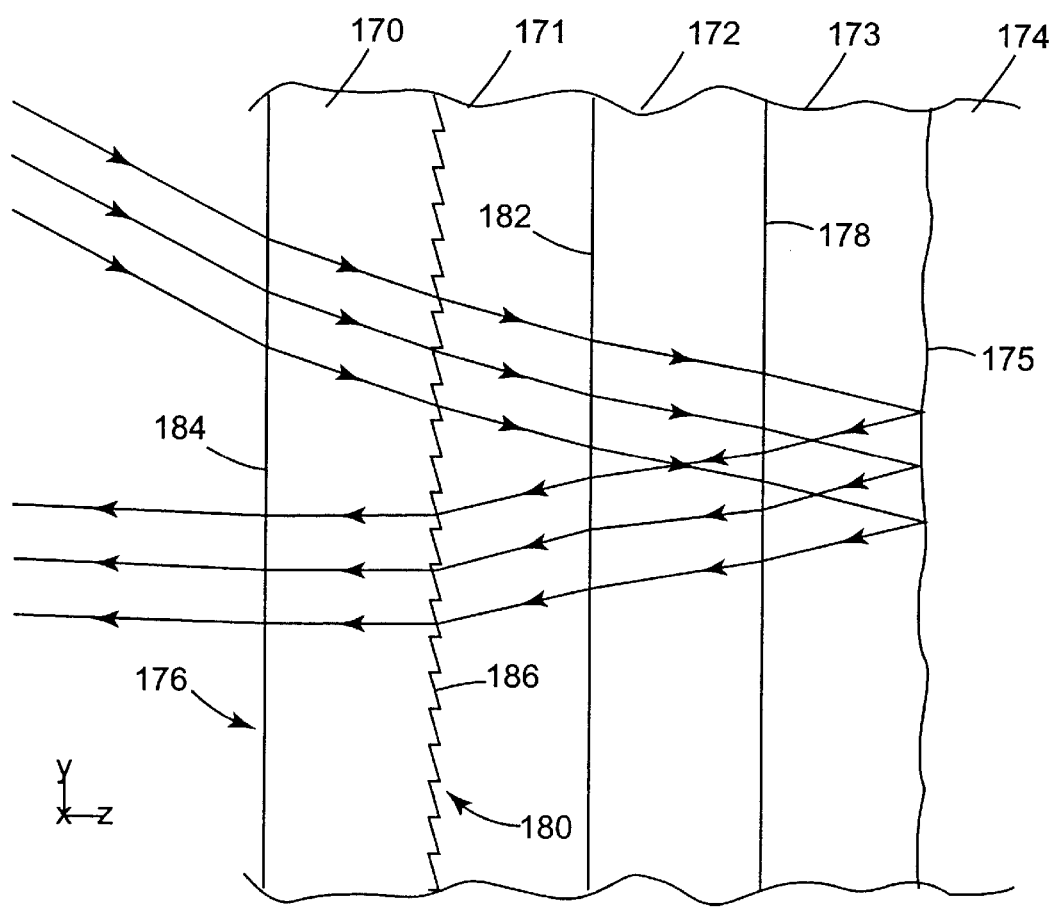
FIG. 16 is a vertical cross-sectional view of a controlled light distribution front projection screen in accordance with the present invention.
Figure 17:
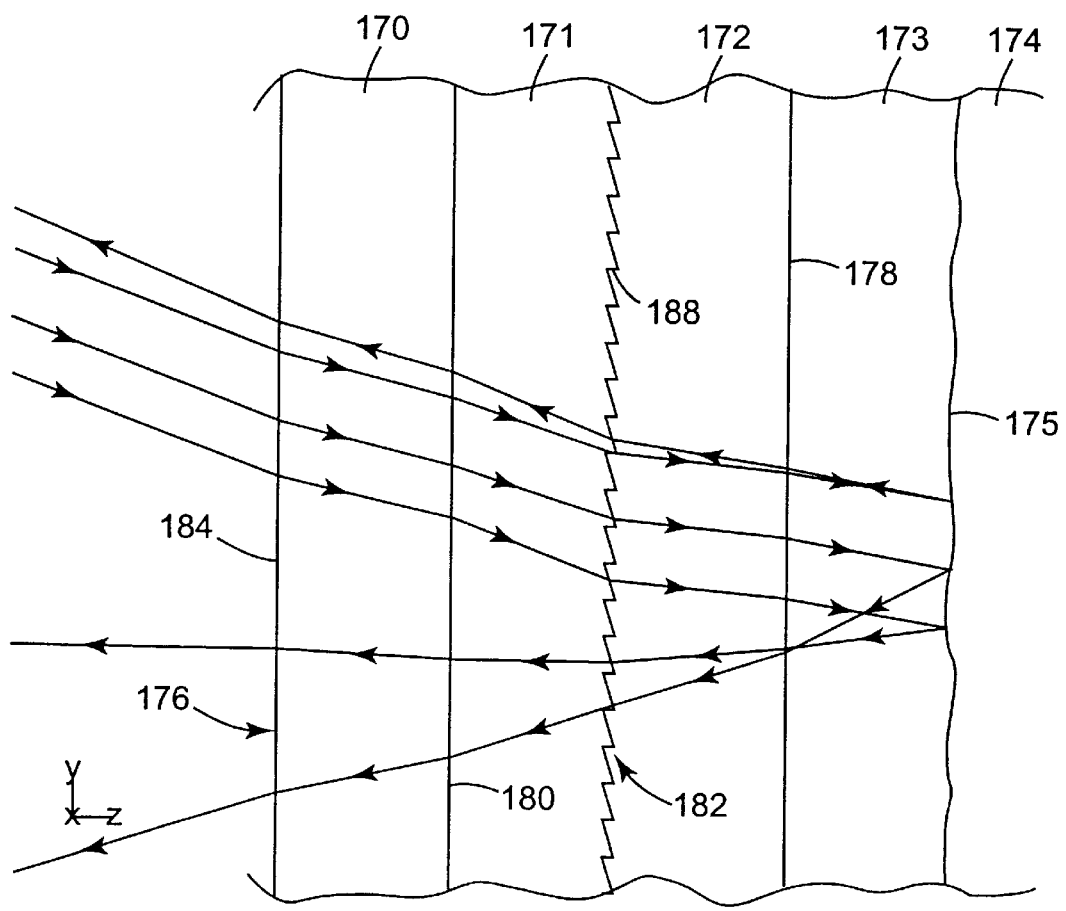
FIG. 17 is a horizontal cross-sectional view of the front projection screen illustrated in FIG. 16.

FIG. 16 illustrates an expanded view of a vertical cross-section of the projection screen 104. FIG. 17 illustrates an expanded plan view of a horizontal cross section of the screen. The projection screen comprises a multi-layer material. The screen 104 includes a first linear Fresnel lens element 170, a second linear Fresnel element 172, and a reflective component 174. First and second spacer elements 171 and 173 may be placed between the Fresnel elements 170 and 172 and between the second Fresnel element 172 and the reflective element 174 respectively. The linear Fresnel lens elements 170 and 172 include a planar side, 176 and 178 respectively, and a prismatic side, 180 and 182 respectively. The first Fresnel element 170 includes a thin isotropic diffusing layer 184 on its planar side 176. The diffusing layer 184 functions as an image-receiving surface. The prismatic side 180 includes a plurality of linear grooves 186 running horizontally in a graduated pattern. The grooves 186 are designed to control the vertical light spread. The lens center is positioned near the top of the projection screen.

The prismatic side 182 of the second linear Fresnel lens element 172 includes a plurality of vertical grooves 188 (FIG. 17) facing the plurality of grooves 186 of the first Fresnel lens element 170. The second linear Fresnel lens element 172 has a lens center positioned on a vertical line extending through the center of the screen. The planar surface 178 of second Fresnel element 172 faces a back reflector 174, having a vertical linear structure reflecting the light back in the direction of the audience. The grooves of the structure back reflector 174 preferably have a cylindrical shape, such as a lenticular structure, or may be a repeating groove pattern of micro facets that approximate a cylindrical shape. An incident surface 175 of the back reflector 174 may be specular or diffuse reflecting, metallic, or white coated, depending on the amount of screen gain and type of screen appearance desired. Second linear Fresnel element 172, in conjunction with the structured back reflector 174, provides control of light distribution spreading in the horizontal direction to accommodate viewers who are positioned horizontally in front of the screen. Alternatively, the reflector structure 174 may be embossed into the planar surface 178, reducing the number of screen elements.

Alternative embodiments of the screen may comprise 3M multi-layer film technology.

Figure 5:
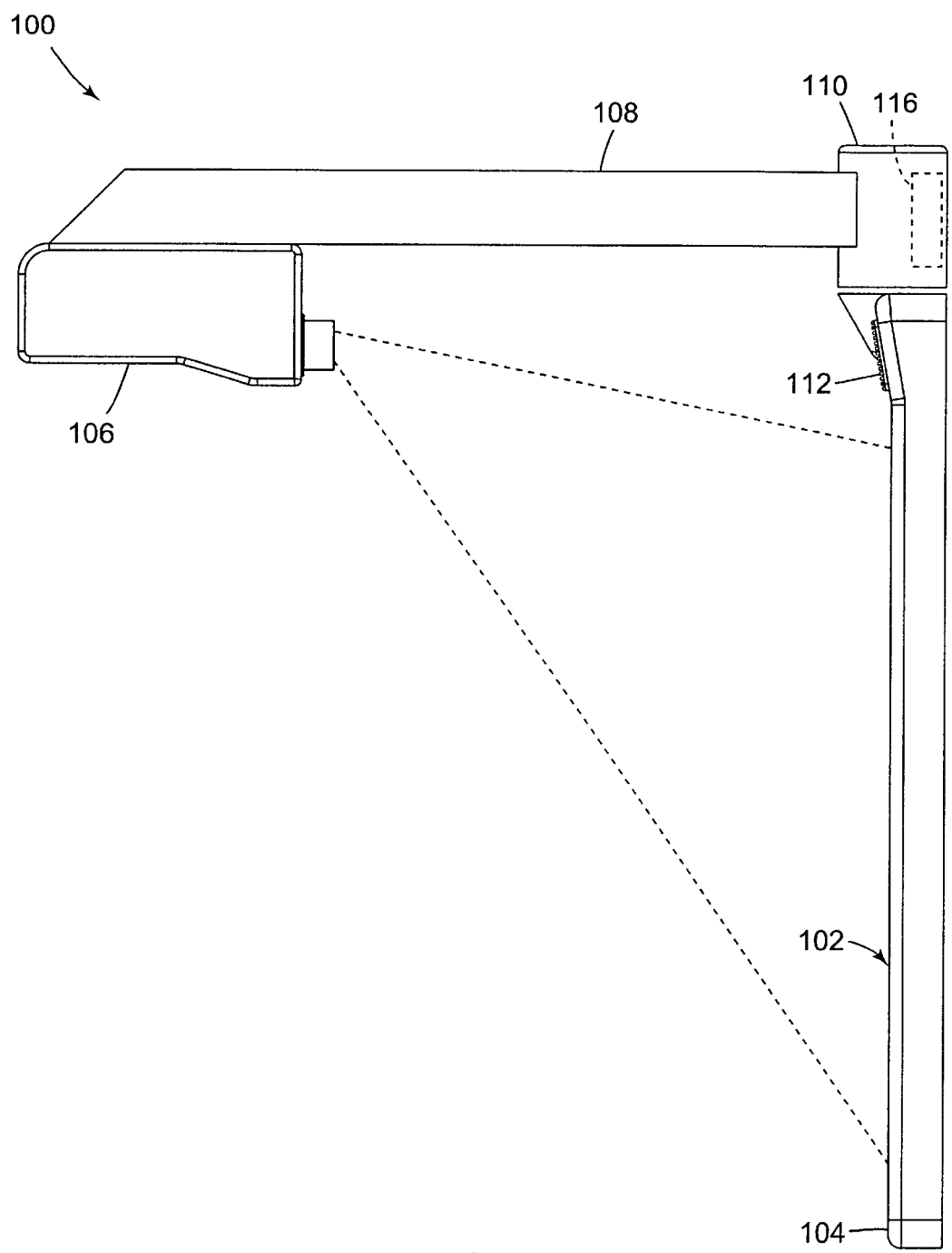
FIG. 5 is a side elevation view of the integrated front projection system illustrated in FIG. 3 in the use or projection position.

As may be appreciated in FIG. 5, the projection system 100 places the projection head 106 at an extreme angle and close distance to the screen 102, thus minimizing the possibility of the presenter's interference. Placement of the optical head 106 at the end of a radically offset projection arm 108 presented unique mechanical and optical challenges. 2o Even the lightest and most compact conventional portable projectors at about 7 lb. (3.2 kg.), may have leveraged unbalanced strain upon the structure components. Optically, the throw distance necessary to even focus the image would have necessitated a long arm, further creating lever amplified stresses on the structure. Even if structurally sound, the system would have projected a severely keystone distorted and relatively small image.

An electronic optical engine includes imaging and electronic components. As better illustrated in FIG. 6, in projection system 100 the arm 108 is a rigid hollow structure surrounded by an outer plastic shell 118. The structure of arm 108 defines an arm chamber 122 and allows for the modular and separate placement of a control and power electronics module 118 and an imaging module 120. The control and power electronics module 118 includes control boards, ballast, and other electronic components. The electronic elements are internally connected through an array of internal power and data connections. The imaging module 120 includes a light source, projection optics, color wheel and imager. By distributing components of the projection system along the arm and the frame, a lesser load is placed on the hinge and the arm. Also, a smaller projector head size becomes possible. Those skilled in the art will recognize that a variety of different modular arrangements may be possible within alternative embodiments of the present invention. For example, alternatively, components of the electronics module may be placed inside of frame 104.

Figure 18:
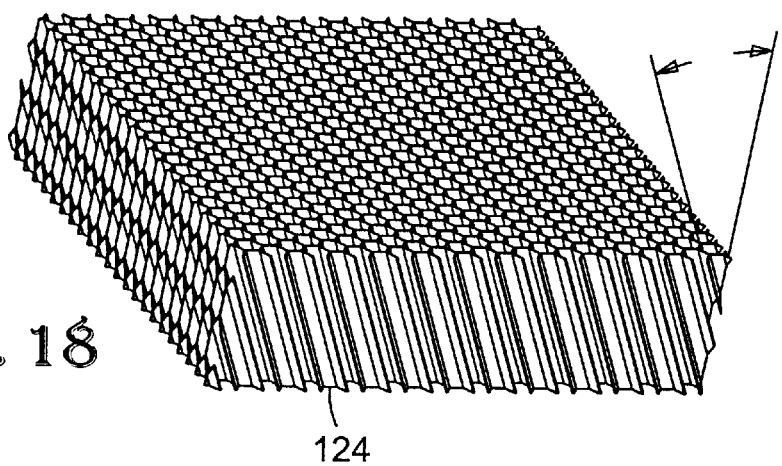
FIG. 18 is a perspective view of a portion of the honeycomb structure of the integrated front projection system illustrated in FIG. 3.
Figure 19:
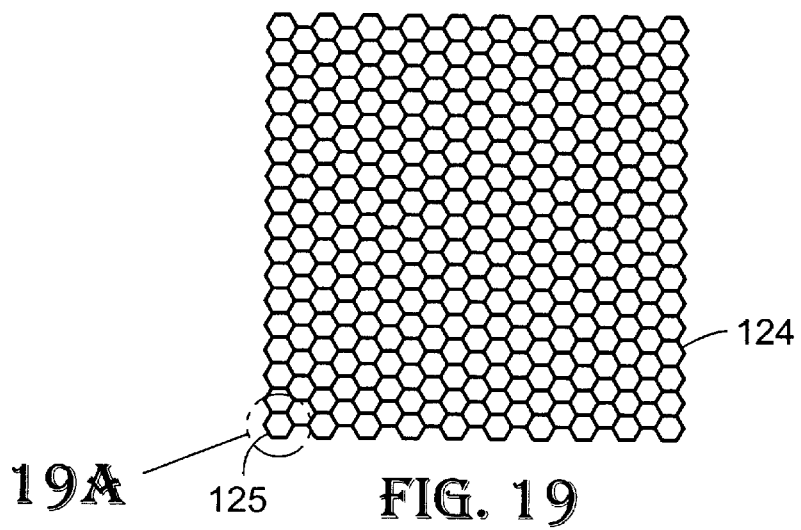
FIG. 19 is a detail plan view of the portion of the honeycomb structure illustrated in FIG. 18.
Figure 19A:
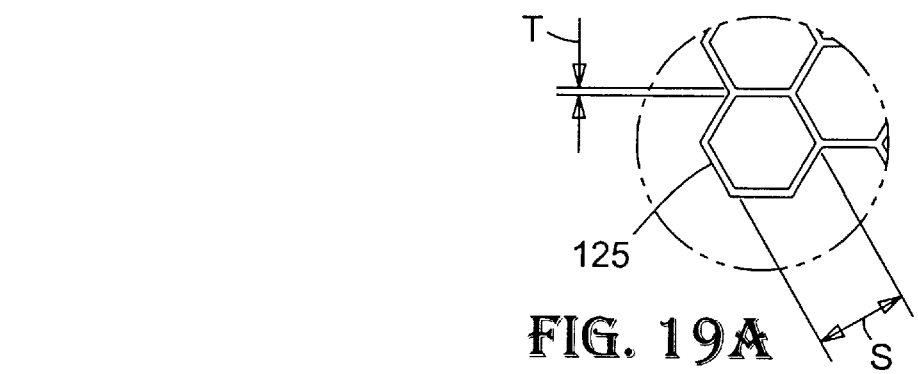

A considerable amount EMI/RFI shielding is required in traditional projector designs to reduce EM crosstalk between the lamp and the electronic components and to have radio frequency containment. The separate placement of electronic components 20 within the arm 108 naturally reduces EMI/RFI interference. Furthermore, in the exemplary system 100, the power supply and control electronics module 118 is enclosed by a honeycomb structure 124 including a plurality of hexagonal cells 125. The honeycomb structure surrounds the power supply and electronics module 118 and provides both EMI/RFI shielding and thermal management characteristics. FIGS. 18 and 19 illustrate details of the honeycomb structure 124. As described in co-pending and co-assigned U.S. patent application Ser. No. 08/883,446, entitled, "Honeycomb Light and Heat Trap for Projector", which is hereby incorporated by reference, the shape, orientation, thickness and size of the hexagonal cells may be tuned to attenuate specific electromagnetic frequencies. In the present exemplary embodiment, the hexagonal cells 125 are aligned generally longitudinally along the arm 108 and are oriented at a predetermined specific angle φ to attenuate high electromagnetic frequencies. The honeycomb structure 124 is an aluminum hexagonal core having 0.25–0.0625 inch (0.635–0.159 cm.) cell size S, 0.002 inch (~0.005 cm.) foil thickness T, and a corrosion resistant coating. The physical separation of the electronic components and the honeycomb structure 124 provide sufficient attenuation to reduce the need for other traditional coatings or shields.

The present arrangement also offers an efficient thermal management system. An air intake 126 is located in the housing of the hinge unit 110. A fan 130, located in the projection head 106, draws air through the air intake 126, through the interior of the hollow projection arm 108, cooling the electronic and power supply components 118 located therein. The air exits the projection head 106 through an air outlet 127. Air also may be drawn through the projection head 106. The flow of cooling air also may be used to cool components located in the projector head 106 or a separate cooling air flow or heat management elements may be employed.

The orientation of the honeycomb structure 124 also is designed to act as a convection heat sink to absorb the thermal energy generated by the electronic module 118 and transfers the heat by convection into the flow of cooling air drawn by the fan 130. The honeycomb structure is oriented to direct airflow over sensitive components. Different portions of the honeycomb structure 124 may have different inclination angles φ direct air flow to different components. The chamber 122 may also include exterior or interior fins, 127 and 128 respectively, to act as high efficient heat exchangers for both lamp and electronics cooling. The ability to direct the flow of cooling air with the honeycomb structure 124 into the interior fins 128 allows for better convection cooling, thus enabling the use of a low CFM fan 130 or even the use of naturally created convection. The cooling arrangement offered by the arm and the honeycomb structure also allows for very low overall power consumption and low audible noise.

Commercially available electronic front projectors are designed to project a specified screen diagonal (D) at a specified throw distance (TD). The throw ratio (TR) of i5 a projector is defined as the ratio of throw distance to screen diagonal. Magnification is measured as screen diagonal/imager diagonal. Optically, the unobtrusive arrangement of the projection head 106 of projection system 100 requires that the image simultaneously accommodate three very demanding requirements: (1) short-throw distance, (2) high magnification, and (3) large keystone correction. To minimize image shadowing, in the present exemplary embodiment, the projector head 106 is located at a projection angle >22° and the arm measures about 36 in. (~91.4 cms). The screen 102 has a screen diagonal between 42 to 60 inches (~107–152 cms.). Accordingly, the design goals for the exemplary display system 100 included (1) a throw distance $\leq$800 mm; (2) a magnification $\geq$50x; and (3) keystone correction for a projection angle $\geq$22°.

Figure 6:
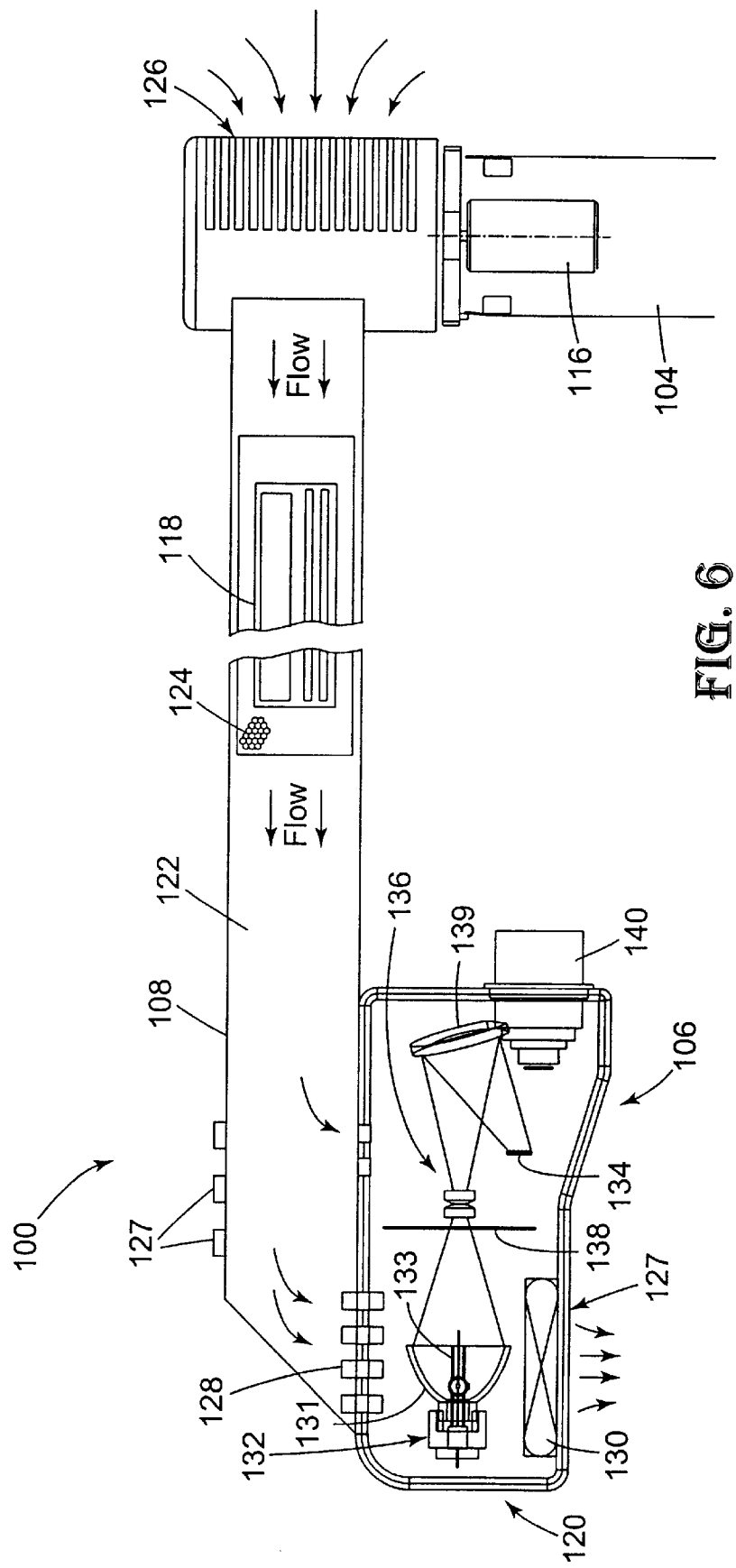
FIG. 6 is a schematic cut-away side elevation view of a first embodiment of the arm and projection head of the integrated front projection system illustrated in FIG. 3.

Referring to FIG. 6, the projection head 106 includes a lamp unit 132, an imager or light valve 134, condensing optics 136, a color wheel 138, a condensing mirror 139 and a projection lens 140. The projection head may also include polarization converters (for polarization rotating imagers), infrared and ultraviolet absorption or reflection filters, an alternative light source possibly coupled with a lamp changing mechanism, reflector mirrors, and other optical components (not shown). The lamp unit 132 includes a reflector 131 and a lamp 133. The reflector 131 focuses the light produced by the lamp 133 through the color wheel 138. The beam of light then is condensed by the condensing optics 136 and the condensing mirror 139. The now condensed beam of light is reflected off the condensing mirror and is directed towards the reflective imager 134, which in turn reflects the light onto the projection lenses 140.

The lamp unit 132 includes an elliptic reflector 131 and a high intensity arc 15 discharge lamp 133, such as the Philips UHP type, from Philips, Eindhoven, The Netherlands, or the OSRAM VIP-270 from Osram, Berlin, Germany. Other suitable bulbs and lamp arrangements may be used, such as metal halide or tungsten halogen lamps.

In the present exemplary embodiment, the imager 134 comprises a single XGA digital micromirror device (DMD) having about a 22 mm diagonal, such as those manufactured by Texas Instruments, Inc., Dallas, Tex. The color wheel 138 is a spinning red/green/blue (RGB) color sequential disc producing 16.7 million colors in the projected image. In alternative embodiments, the color wheel and the imager 134 may be replaced by different suitable configurations, such as a liquid crystal RGB color sequential shutter and a reflective or transmissive liquid crystal display (LCD) imager. Those skilled in the art will readily recognize that other optical components and arrangements may be possible in accordance with the spirit of the present invention.

The imager 134 and the lamp 132 may be cooled by the airflow generated by the fan 130. A further thermal advantage of the arrangement of the present embodiment is that the warmer components, such as the lamp, are located at an end portion of the cooling air flow path, thus preventing the intense heat from the lamp from affecting delicate electronic components.

Traditional projector lenses proved unsuitable to accomplish the simultaneous requirements of the display system 100. Accordingly, the present invention addresses this problem by the innovative conversion of 35 mm camera lenses having a small f-number and a large field of view into projection lenses. The projection lens 140 has a focal length about 14 to 20 mm, and a speed of f/2.8 or less. Suitable lenses include Nikon 18 mm., f/2.8D Nikkor from Nikon, Japan, or Canon Photo EF 14 mm. f/2.8L USM from Canon, Japan. The focus of the lens 140 is preset for optimal resolution on screen 102.

To provide 22° keystone correction, the light valve center is shifted from the projection lens center by an amount equal to the projection angle. Such a large degree of keystone correction is possible because the projection angle is known and is repeatable. At projection angles exceeding 22°, the projection lens is selected to have a full field coverage angle exceeding 90°. In alternative embodiments, even larger keystone correction are possible, thus enabling the use of even a shorter projection arm. The keystone correction features need not be limited only to the optics. Keystone corrected optics, electronic keystone correction means, and screen inclination may be combined to achieve a suitable image. In an alternative embodiment, the screen may be motor driven, to reach an inclined projection position at the time that the arm is placed in the open position.

Figure 7:
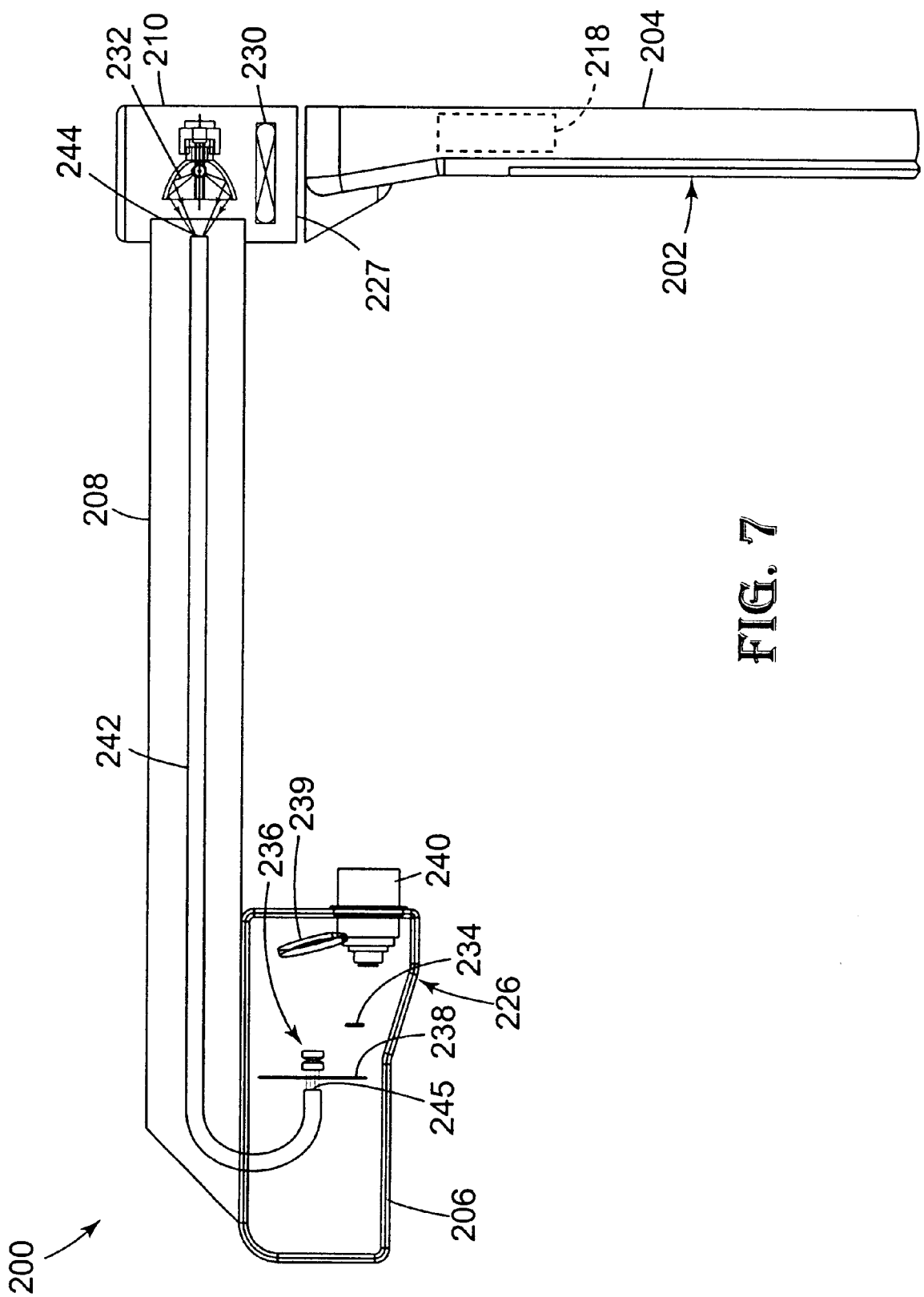
FIG. 7 is a schematic cut-away side elevation view of a second embodiment of the arm and projection head of the integrated front projection system illustrated in FIG. 3.

FIG. 7 illustrates a second exemplary embodiment of the present invention. The same last two digits in the reference numerals designate similar elements in all exemplary embodiments. To decrease the size of the light engine even further and to reduce the size and weight of projector head 206 and arm 208, lamp 232 and fan 230 are placed within hinge unit 210 or within frame 204. Power supply and electronic components 218 are located inside frame 204 and behind screen 202. A sequential color wheel 238, a projection lens 240, and condensing optics 236, including a condensing mirror 239, remain within the projector head 206. A flexible illumination waveguide 242 is channeled through the projection arm 208 and couples the illumination from the lamp or light source 232 to the condensing optics 236. The lamp 232 focuses light into an entrance aperture 244 of the illumination waveguide 242. The light is transmitted by the illumination waveguide 242 up to an exit aperture 245, where the light is then directed through the color wheel 138 to the condensing optics 236 and 239. In the present embodiment, the illumination waveguide 242 is a solid large core plastic optical fiber, such as Spotlight type LF90FB from Sumitomo 3M Company, Ltd., Japan, or Stay-Flex type SEL 400-from Lumenyte International Corp., of Irvine, Calif.

Cooling in system 200 is performed in a reverse direction than in system 100. The cooling mechanism or fan 230 draws air from the air intake 226 located in the projection head 206 and exhausts air through the air exhaust 227 located on the hinge unit 210.

Figure 8:
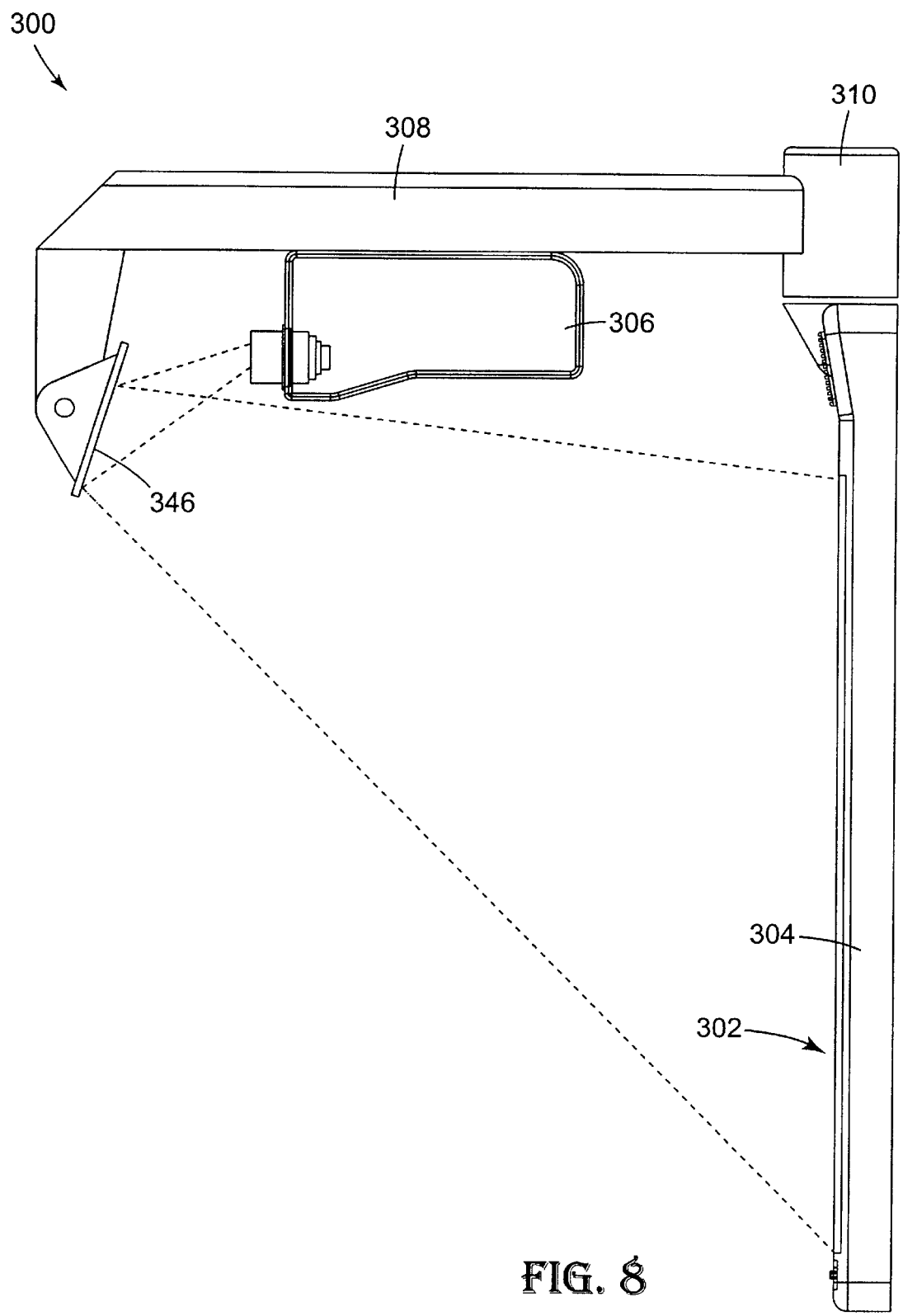
FIG. 8 is a side elevation view of a third embodiment of an integrated front projection system in accordance with the present invention in the use or projection position.

FIG. 8 illustrates a third exemplary embodiment of a projection system 300 in accordance with the present invention. The projection system 300 includes a projection head 306 mounted along the mid-span of a pivoting arm 308. The projection head 306 is substantially similar to the projection head 106 in system 100. The image projected by a projection lens 340 of the projection head 306 is reflected off a mirror or reflective surface 346 onto a screen 302. The arrangement of optical system 300 allows for an increased throw distance and magnification while maintaining the same arm length or for the same throw distance and magnification with a shorter pivoting arm.

Figure 9:
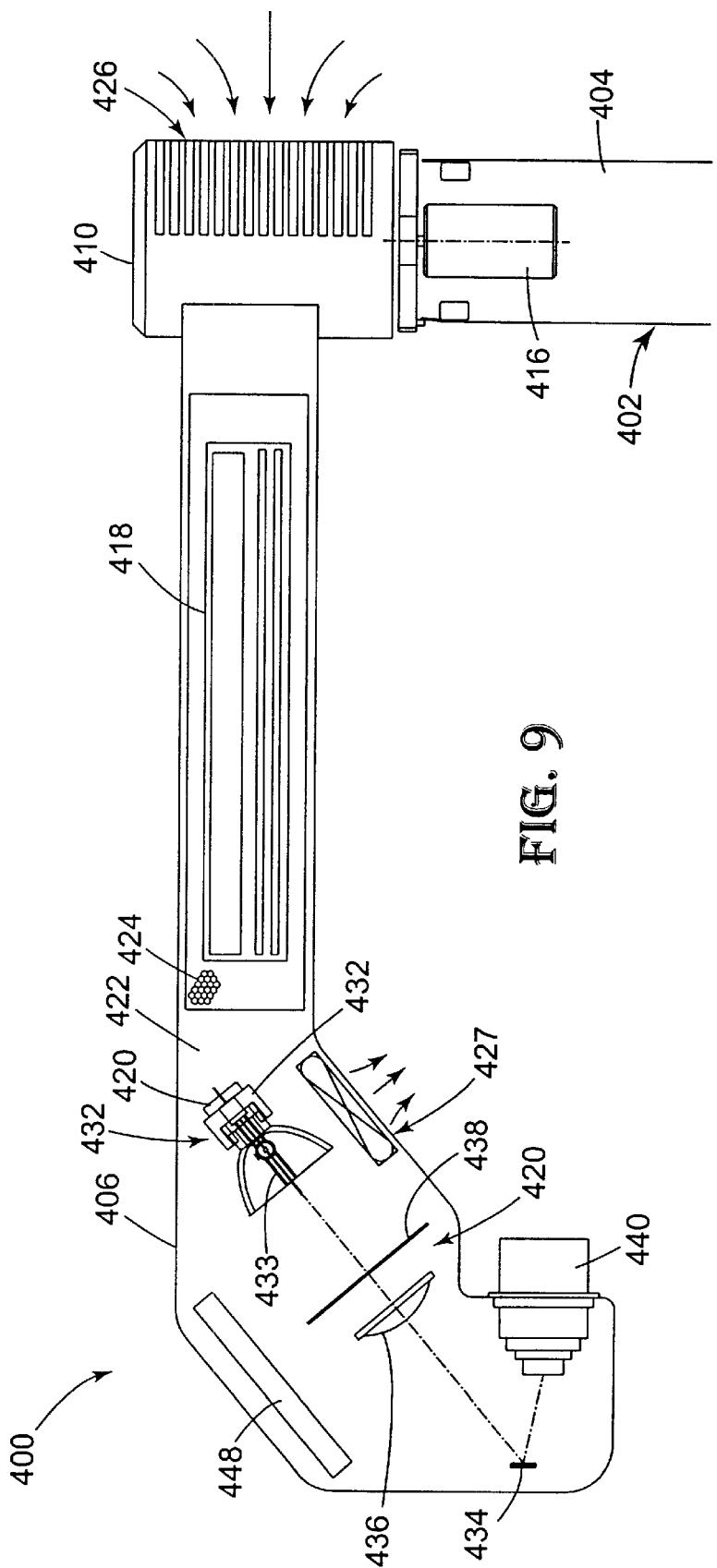
FIG. 9 is a schematic cut-away side elevation view of a fourth embodiment of the arm and projection head of an integrated front projection system in accordance with the present invention.

FIG. 9 illustrates a fourth exemplary embodiment of a projection system 400 in accordance with the present invention, having a screen 402, a frame 404, a projection head 406, and an arm 408. The projection head 406 of the projection system 400 includes a lamp 432 optically aligned with a transmissive color wheel 438 and condensing optics 436. After passing through the color wheel 438 and the condensing optics 436, a light beam is focused upon a reflective imager 434, which, in turn, directs the light beam towards a retrofocus projection lens 440. The projector system 400 includes modular power supply and system electronics 418 and a separate modular driver board 448 for the imager 434.

Figure 10:
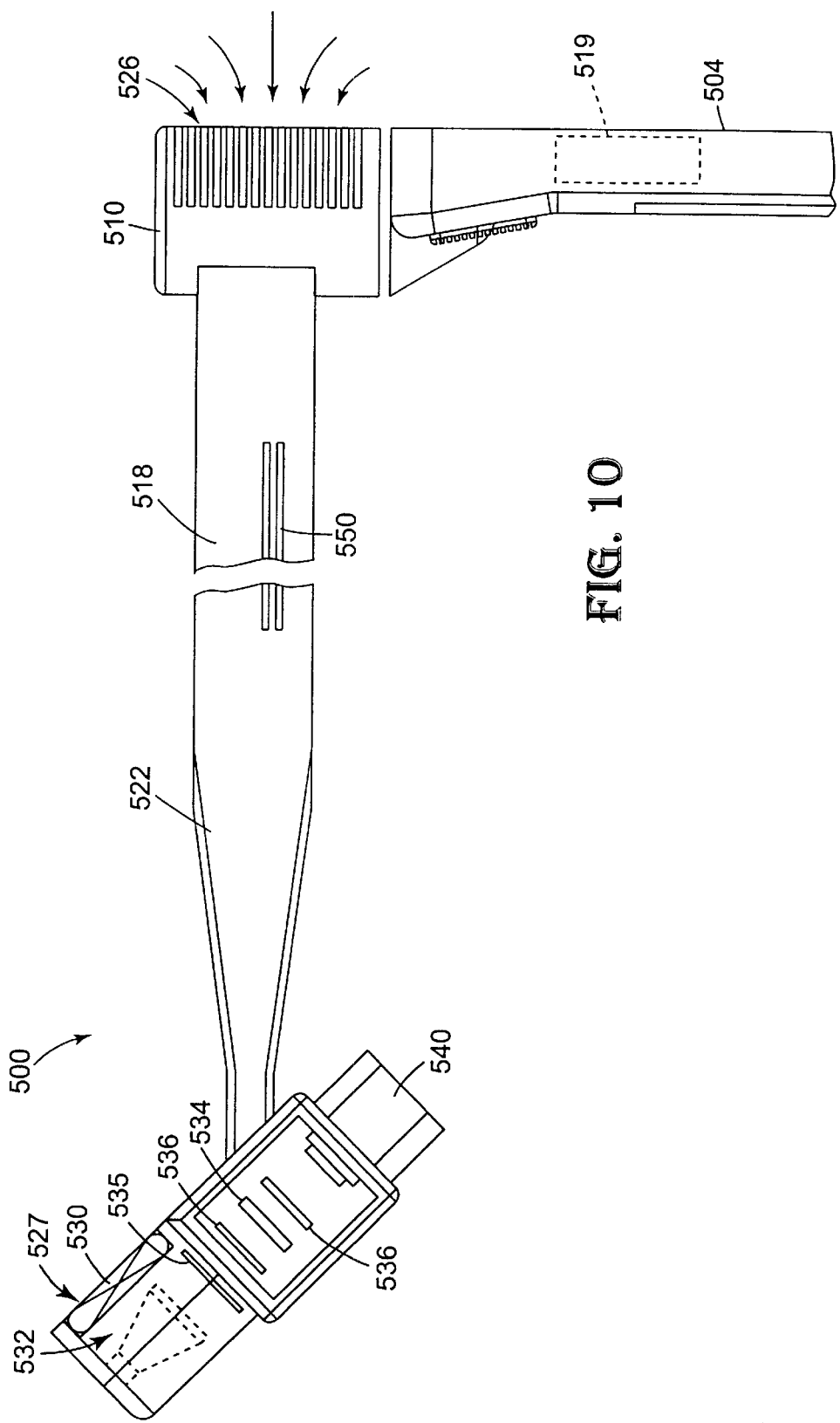
FIG. 10 is a schematic cut-away side elevation view of a fifth embodiment of the arm and projection head of an integrated front projection system in accordance with the present invention.
Figure 11:
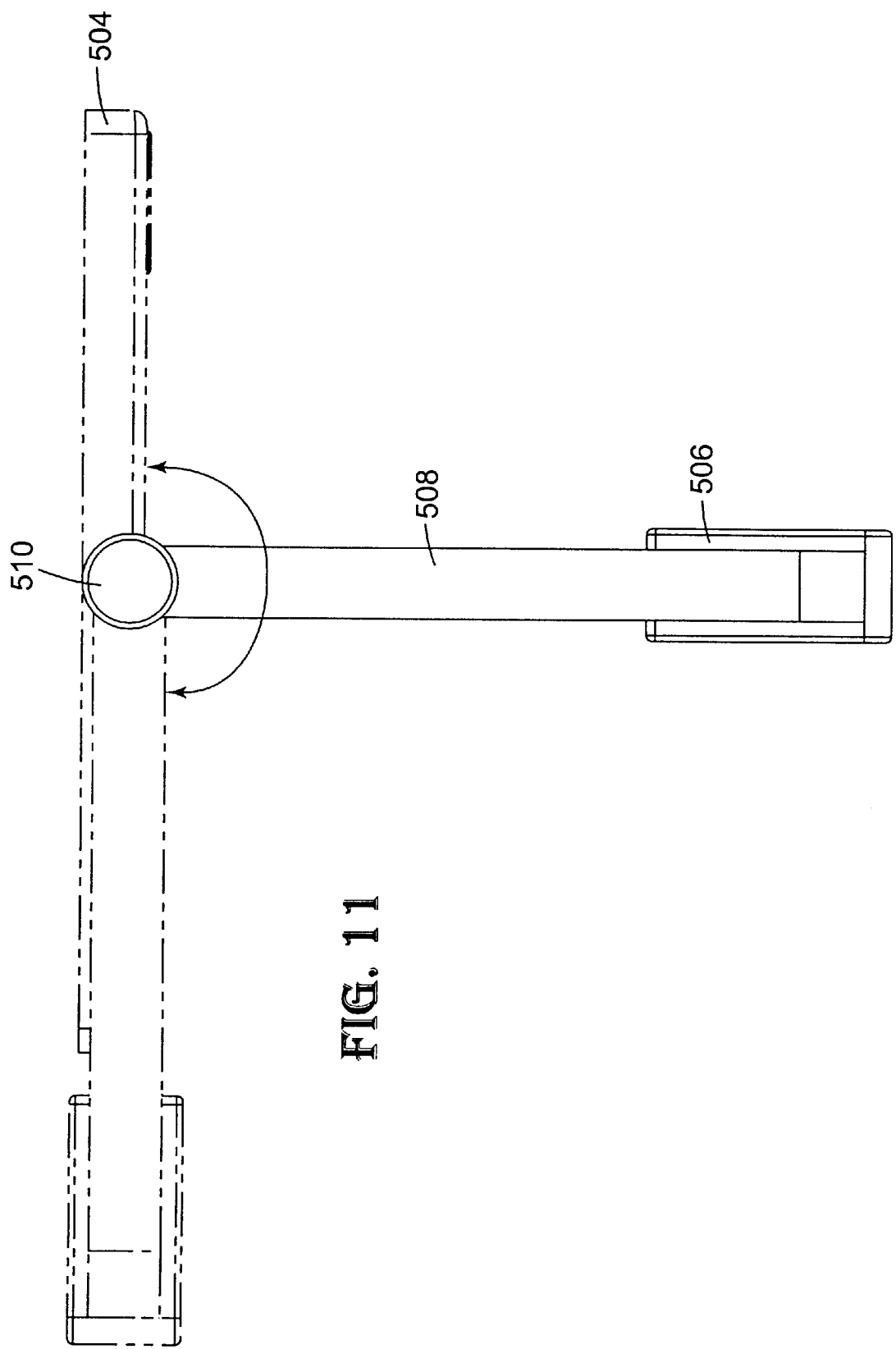
FIG. 11 is a top plan view of the integrated front projection system illustrated in FIG. 10.

FIG. 10 illustrates a fifth exemplary embodiment of a projection system 500 in accordance with the present invention. In the projection system 500, the power supply electronics 519 are positioned inside of a frame 504. A hinge 510 couples an arm 508 holding a projector head 506 to the frame 504. Electronic control boards 550 are positioned within the arm 508. The projection head 506 includes a lamp unit 532, a polarizer 535, optics 536, a transmissive LCD imager 534, and projection lens 540, all aligned in a straight optical path. A fan 530 provides ventilation. As illustrated in FIG. 11, the arm 508 may be rotated a±90° for storage on the right or the left side.

Figure 12:
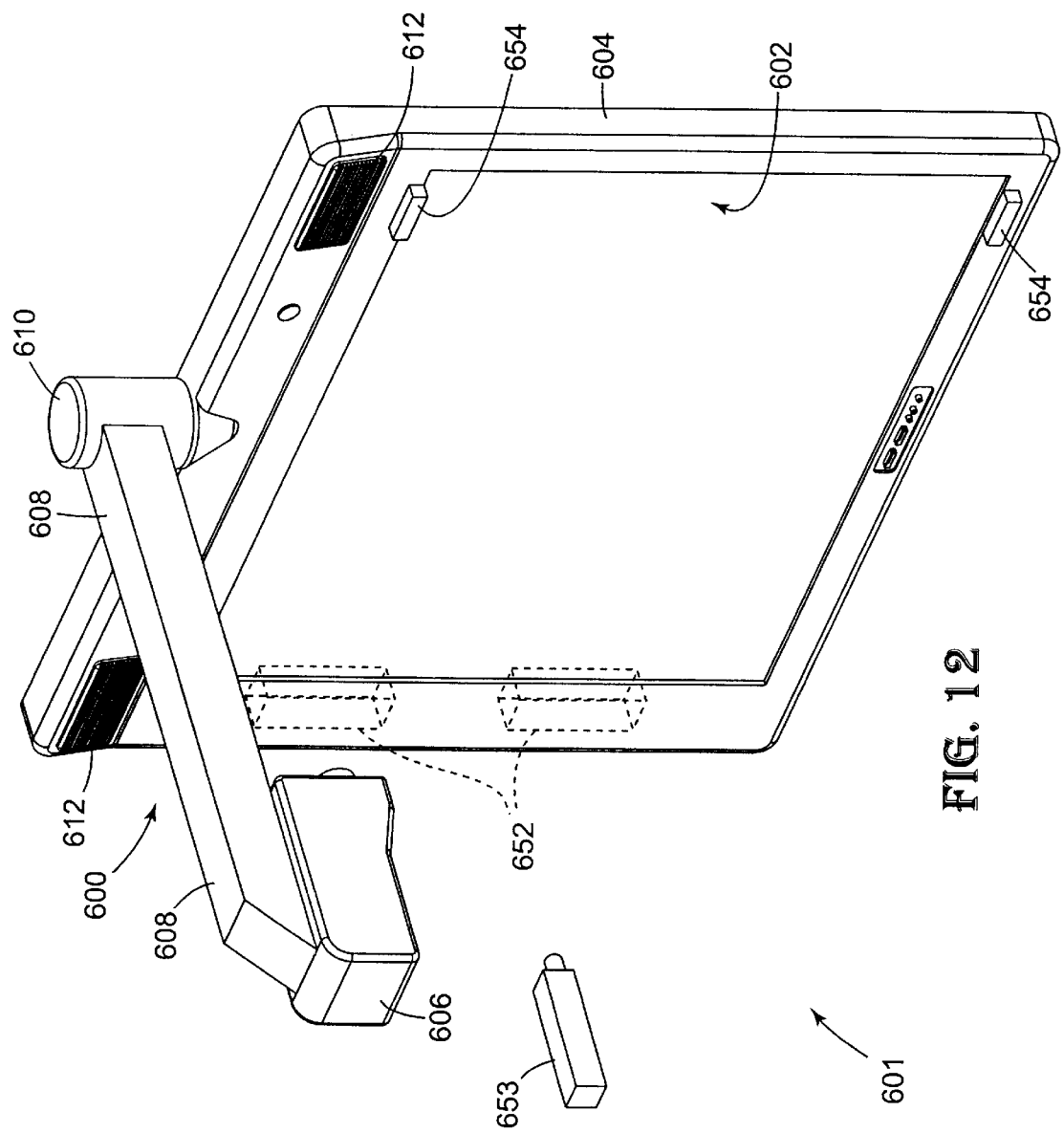
FIG. 12 is a perspective view of a sixth embodiment of an integrated front projection system in accordance with the present invention.
Figure 13:
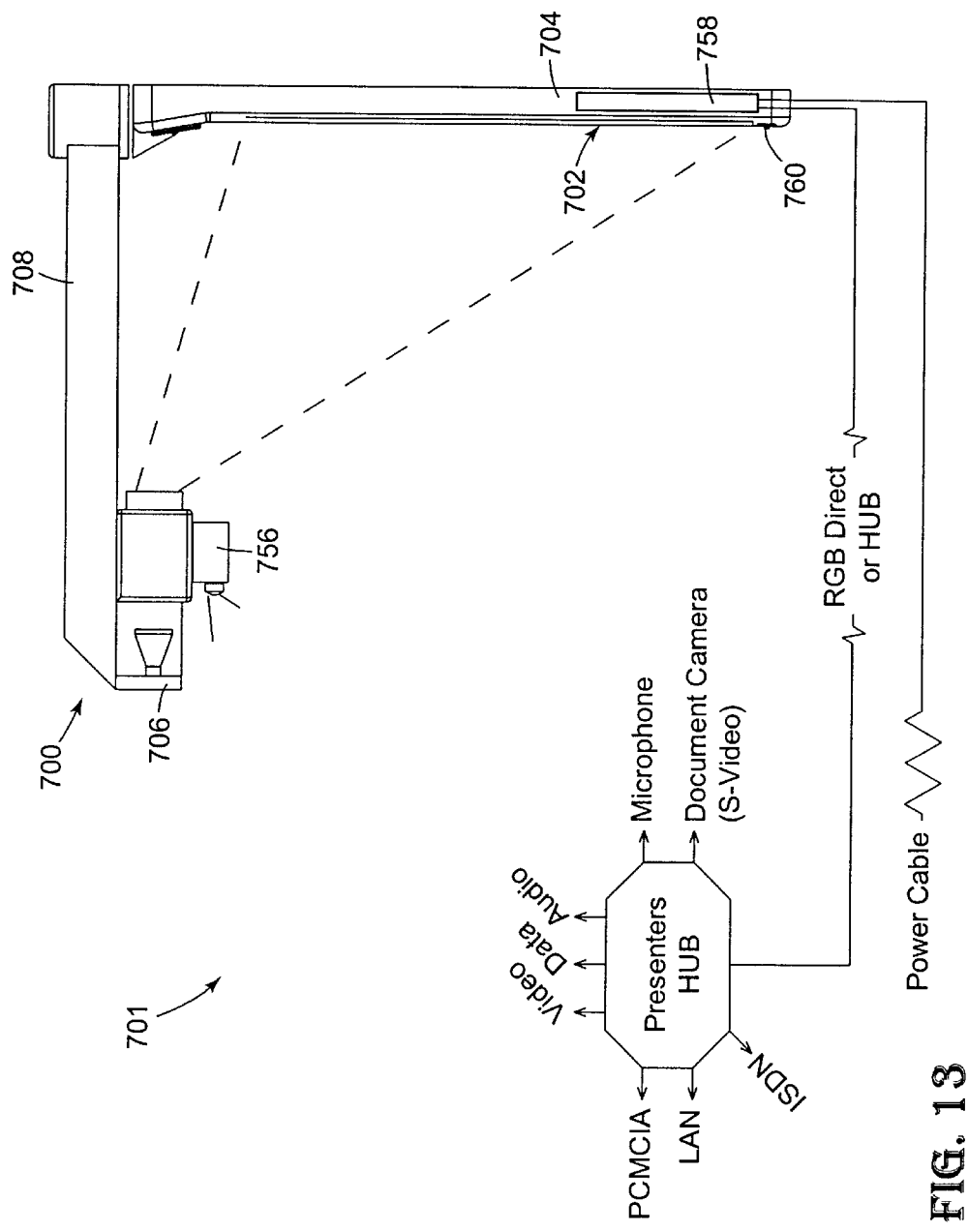
FIG. 13 is a perspective view of a seventh embodiment of an integrated front projection system in accordance with the present invention.

FIGS. 12 and 13 illustrate the versatility of the projection system of the present invention. FIG. 12 illustrates a digital whiteboard system 601 including a projection system 600 in accordance with the present invention and an input device, such as a stylus, 653. The projection system 600 includes integrated electronics for an annotation system 652, as well as LTV, K laser or other type of sensors 654. The sensors 654 are calibrated to track the movement of the stylus 653 on the surface of the screen. The stylus 653 similarly may include transmitters and/or sensors to aid in tracking and to coordinate timing or control signals with electronics 652. The screen 602 may be coated to allow for erasable whiteboard use. The integrated electronics 652 may include a CPU.

FIG. 13 illustrates a videoconferencing and/or dataconferencing system 701, including a projection system 700 in accordance with the present invention. A camera 756, such as a CMOS or CCD camera, is mounted on the projection head 706 or on the frame 704. The camera 756 may pivot to capture a presenter or to capture documents placed on the screen 702. Alternatively, additional cameras may be directed to the presenter and to the screen. Again, the screen may be coated to act as an erasable whiteboard. The camera 756 is directly coupled to a CPU 758 integrally placed within the frame 704. A microphone 760 also is placed within the frame 704. Additional electronic modules, such as a tuner, network card, sound card, video card, communication devices, and others may be placed within the frame 704.

Those skilled in the art will readily appreciate that elements of the present invention may be combined, separately or in one system, to provide videoconferencing, data-conferencing, and electronic whiteboard functions, as well a any other function where a light and compact display system may be useful.

As the system of the present invention is designed to optimize the projection image at the predetermined projection position, no set-up adjustments are necessary to the optics, mechanics, or electronics and optimal on-screen performance is consistently offered. The integral structure of the system 100 allows for easier storage and portability and avoids cabling and positioning associated with the use of traditional projectors.

Those skilled in the art will appreciate that the present invention may be used with a variety of different optical components. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. An integrated front projection display comprising:
   a) a front projection screen;
   b) a movable arm coupled to the flat projection screen, the arm having a storage position and a projection position; and
   c) a front projection head coupled to the arm, wherein when the arm is in the projection position, the front projection head is at a predetermined position with respect to the front projection screen wherein the projection head includes projection optics having:
      i) a mechanical off-axis keystone correction compensation greater or approximately equal to 22°,
      ii) a throw distance of at most 800 mm, and
      iii) a throw-to-screen diagonal ratio of at most 1; and
   d) a digital whiteboard system comprising at least one sensor to track the movement of a stylus on the projection screen.

2. The integrated front projection display of claim 1, wherein the screen includes an erasable whiteboard.

3. The integrated front projection display of claim 1, wherein the at least one sensor is a UV sensor.

4. The integrated front projection display of claim 1, wherein the at least one sensor is an IR sensor.

5. The integrated front projection display of claim 1, wherein the at least one sensor is a laser sensor.

6. The integrated front projection display of claim 1, further comprising a stylus, wherein the stylus includes transmitters that provide signals to the at least one sensor.

7. The integrated front projection display of claim 1, wherein the front projection screen is mounted on a frame housing having a side bezel and the digital whiteboard system is mounted on one of said side bezel of said frame housing.

8. The integrated front projection display of claim 7, wherein the at least one sensor is attached to said frame housing.

9. The integrated front projection display of claim 8, wherein the digital whiteboard system is modular and removable.

10. The integrated front projection display of claim 1, wherein the digital whiteboard system is modular and removable.

11. An integrated front projection display system comprising:
    a) a planar projection screen formed on a front surface of a rigid frame, the screen including means for reflecting light from the screen in a preselected spatial distribution;
    b) a movable arm hingedly connected at a first end to the rigid frame, the arm being movable between a storage position and a projection position, the arm further comprising means for moving the arm between said storage and projection positions and for retaining the arm at each of said positions;
    c) a projection head mounted on a second end of the movable arm such that it does not substantially obstruct the view of the projection screen when the arm is in the projection position, the projection head including means for providing an image to be displayed, means for focusing the image onto the projection screen, and means for correcting the keystone effect in the projected image when the arm is in the projection position.; and
    d) a digital whiteboard system comprising at least one sensor to track the movement of a stylus on the projection screen.

12. The integrated front projection display of claim 11, wherein the screen includes an erasable whiteboard.

13. The integrated front projection display of claim 11, wherein the at least one sensor is a UV sensor.

14. The integrated front projection display of claim 11, wherein the at least one sensor is an IR sensor.

15. The integrated front projection display of claim 11, wherein the at least one sensor is a laser sensor.

16. The integrated front projection display of claim 11, further comprising a stylus, wherein the stylus includes transmitters that provide signals to the at least one sensor.

17. The integrated front projection display of claim 11, wherein the frame has at least one side member and the digital whiteboard system is mounted on one of said side member.

18. The integrated front projection display of claim 17, wherein the at least one sensor is attached to said frame.

19. The integrated front projection display of claim 18, wherein the digital whiteboard system is modular and removable.

20. The integrated front projection display of claim 11, wherein the digital whiteboard system is modular and removable.

21. A front projection system comprising:
    a) a front projection screen; and
    b) a front projector device integrally coupled to the projection screen, the projector device having:
       i) a mechanical off-axis keystone correction compensation greater or approximately equal to 22°,
       ii) a throw distance of at most 800 mm,
       iii) a throw-to-screen diagonal ratio of at most one; and
    c) a digital whiteboard system comprising at least one sensor to track the movement of a stylus on the projection screen.

22. The integrated front projection display of claim 21, wherein the screen includes an erasable whiteboard.

23. The integrated front projection display of claim 21, wherein the at least one sensor is a UV sensor.

24. The integrated front projection display of claim 21, wherein the at least one sensor is an IR sensor.

25. The integrated front projection display of claim 21, wherein the at least one sensor is a laser sensor.

26. The integrated front projection display of claim 21, further comprising a stylus, wherein the stylus includes transmitters that provide signals to the at least one sensor.

27. The integrated front projection display of claim 21, wherein the front projection screen is mounted on a frame housing having a side bezel and the digital whiteboard system is mounted on one of said side bezel of said frame housing.

28. The integrated front projection display of claim 27, wherein the at least one sensor is attached to said frame housing.

29. The integrated front projection display of claim 28, wherein the digital whiteboard system is modular and removable.

30. The integrated front projection display of claim 21, wherein the digital whiteboard system is modular and removable.

* * * * *